UNITED STATES PATENT OFFICE.

JOHN C. LINCOLN, OF EAST CLEVELAND, OHIO.

PROCESS OF WELDING METALS.

1,108,592.  Specification of Letters Patent.  Patented Aug. 25, 1914.

No Drawing.  Application filed January 21, 1913.  Serial No. 743,282.

*To all whom it may concern:*

Be it known that I, JOHN C. LINCOLN, citizen of the United States of America, residing at East Cleveland, in the county of Cuyahoga and State of Ohio, have invented certain new and useful Improvements in Processes for Welding Metals, of which the following is a specification.

My invention relates to an improved process for welding metals, and has for its object, the accomplishment of a union or weld between separate surfaces or edges of metals, which shall possess the maximum strength and involve no material expense beyond the normal cost of welding.

It was found with some classes of welding, particularly where the metal is of light gage, and the electric arc is employed, that much of the welding is defective, which presumably is due to the action of the intense heat upon a restricted body of metal. Accordingly, the metal is broken with relative ease at or adjacent to the welded seam. My invention is capable of overcoming this apparently inherent defect in the commercial process, and moreover is adapted generally to improve ordinary welding as commercially practised, by using the electric arc, the acetylene blow-pipe, or other suitable means for effecting a welding heat.

Briefly stated, my invention consists in intimately applying to the adjacent portions, previous to their actual fusion, a suitable material which will effectively strengthen the joint, as by effecting structural and chemical changes, and prevent deteriorating influence upon the welded metal in the presence of a welding heat. The simplest and cheapest mode of accomplishing this end, known to me, speaking particularly with regard to the welding of sheet steel, is the application to the edges or surfaces to be welded, of a very limited amount of a suitable metal in finely divided form. I have adopted for practising my invention, finely comminuted magnesium, aluminum, copper, manganese or zinc. This is applied directly to or adjacent to the edges or surfaces of the sheet steel which are to be welded, either in the form of a powder, or more readily still, by mixing the finely divided metal, with resin or a suitable liquid carrying-medium, and painting said edges or surfaces. Ordinary aluminum paint as commonly sold upon the market, may be used for this purpose, and unskilled labor only is required for applying the material to the weld. Moreover, a single coat of the metallic paint ordinarily is sufficient for perfecting the weld, which is accomplished in the usual and well known manner by the intense heat of the electric arc, or other suitable source of heat.

At times, I have found that copper or aluminum-foil, for example, may be applied with advantage to an exposed surface or edge which is to be welded, but it is invariably desirable that the amount thereof be kept within very restricted limits.

Some of the metals with which I have experimented, such as finely divided iron, tin and lead, do not appear to improve the welding action to any sufficient or noticeable degree. My experience would indicate that so called "flash-powder" or magnesium affords the best welding agent, although aluminum is almost as efficient in operating upon iron and steel. The mixture of varying proportions of resin, with the finely divided metals, is desirable, whether affording only a retaining medium therefor under the electric arc, or possibly assisting in producing a strong clean weld. However, the metals themselves may be used alone in finely divided form, as metallic paint or beaten into foil; the paint being the most convenient.

Repeated tests of the welded seams or joints, produced in the manner described, proved them to be of marked superiority, as compared with similar welds accomplished without the use of the aluminum, magnesium or other metal, although the limited quantity thereof appears to be absent or negligible in the welded seam or joint. Doubtless the applied metal is dissipated or converted by the intense heat necessary for fusing the steel.

One physical characteristic which I have observed in the completed welds produced in the manner described, is that the crystals of the steel are coarser or larger, and of a different shade or color, than when the preliminary application of the foreign metal is omitted.

It will be found that upon attempting to break a joint welded in the manner described, a fracture will occur in the metal along a line more or less distant from the weld, thereby demonstrating the efficiency of my improved method.

I have been unable to determine with any certainty, what office is performed by the small amount of foreign metal, other than the actual results stated. However, it is my understanding that other metals or alloys in small quantities, or suitable deoxydizing agents, may be employed in an analogous manner, and in minute quantities, for perfecting and augmenting the welding operation.

From the experiments and practical work which I have thus far conducted in connection with my invention, it appears to be probable that the finely divided foreign metal acts as a deoxidizing agent at high temperatures, and prevents the oxidation of the iron or steel. Moreover, there may be formed minute quantities of an alloy during the fusion of the welded metal, and it is certain that the structure of said metal is altered during the welding process described.

Having now described the preferred method of practising my invention, but without limiting myself to the details set forth, I claim as new, and desire to secure by Letters Patent, the following:—

1. The method, substantially as herein described, for welding metals, which consists in supplying minute quantities of a metallic structural modifying element thereto, in the presence of a welding heat.

2. The method, substantially as herein described, for welding metallic surfaces, which consists is applying minute quantities of another metal having a deoxydizing effect, to the surfaces subjected to the welding operation, under the influence of a welding heat.

3. The method, substantially as herein described, for welding iron or steel, which consists in applying minute quantities of magnesium to the surfaces to be welded, and subjecting the same to a welding heat.

4. The method, substantially as herein described, for welding metallic surfaces, which consists in applying a minute coating of a finely-divided foreign metal thereto, and subjecting the same to a welding heat.

5. The method, substantially as herein described, for welding metallic surfaces, which consists in supplying minute quantities of metallic alloying and deoxidizing agents, in the presence of a welding heat prior to the completion of fusion.

6. The method, substantially as herein described, for welding metallic surfaces, which consists in painting the joint to be welded with a finely comminuted metallic paint, and subjecting said joint to a welding heat.

7. The method, substantially as herein described, for welding sheet-steel articles, which consists in painting the joint to be welded with magnesium paint, and thereafter subjecting the same to the electric arc.

8. The method, substantially as herein described, for welding metals, which consists in applying a minute quantity of a foreign metal to the welded portions, and subjecting the same to a welding heat.

In testimony whereof I do now affix my signature in the presence of two witnesses.

JOHN C. LINCOLN.

Witnesses:
  E. M. NICKELS,
  ALBERT LYNN LAWRENCE.